(12) United States Patent
Lambert et al.

(10) Patent No.: US 11,835,699 B2
(45) Date of Patent: Dec. 5, 2023

(54) FOCUSING DEVICE AND EUV RADIATION GENERATING DEVICE HAVING SAME

(71) Applicant: TRUMPF Lasersystems for Semiconductor Manufacturing GmbH, Ditzingen (DE)

(72) Inventors: Martin Lambert, Korb (DE); Tolga Ergin, Bietigheim-Bissingen (DE)

(73) Assignee: TRUMPF LASERSYSTEMS FOR SEMICONDUCTOR MANUFACTURING GMBH, Ditzingen (DE)

(*) Notice: Subject to any disclaimer, the term of this patent is extended or adjusted under 35 U.S.C. 154(b) by 398 days.

(21) Appl. No.: 17/096,979

(22) Filed: Nov. 13, 2020

(65) Prior Publication Data

US 2021/0063712 A1    Mar. 4, 2021

Related U.S. Application Data

(63) Continuation of application No. PCT/EP2018/062317, filed on May 14, 2018.

(51) Int. Cl.
| | |
|---|---|
| *G02B 27/09* | (2006.01) |
| *G02B 17/06* | (2006.01) |
| *G02B 7/182* | (2021.01) |
| *H05G 2/00* | (2006.01) |

(52) U.S. Cl.
CPC ....... *G02B 17/0673* (2013.01); *G02B 7/1827* (2013.01); *G02B 17/0621* (2013.01); *G02B 27/09* (2013.01); *H05G 2/008* (2013.01)

(58) Field of Classification Search
CPC .............. G02B 17/0673; G02B 7/1827; G02B 17/0621; G02B 27/09; G02B 17/0605; G02B 17/0668; H05G 2/008; H01S 3/005
USPC ...................................... 250/504 R
See application file for complete search history.

(56) References Cited

U.S. PATENT DOCUMENTS

| | | | |
|---|---|---|---|
| 3,950,079 A * | 4/1976 | Rambauske | G02B 7/1827 |
| | | | 359/876 |
| 5,144,476 A | 9/1992 | Kebo | |
| 9,360,680 B1 * | 6/2016 | Syrgabaev | G01J 1/0266 |
| 9,575,324 B2 * | 2/2017 | Lambert | G21K 1/06 |
| 2006/0102603 A1 | 5/2006 | Zeller et al. | |
| 2012/0019826 A1 | 1/2012 | Bergstedt et al. | |
| 2013/0271761 A1 | 10/2013 | Rutberg et al. | |

(Continued)

FOREIGN PATENT DOCUMENTS

| | | |
|---|---|---|
| CN | 103210303 A | 7/2013 |
| CN | 103841744 A | 6/2014 |

(Continued)

*Primary Examiner* — Michael Maskell
(74) *Attorney, Agent, or Firm* — LEYDIG, VOIT & MAYER, LTD.

(57) ABSTRACT

A focusing device for focusing a laser beam in a target area. The focusing device includes a paraboloid mirror configured to widen the laser beam; an ellipsoid mirror or a hyperboloid mirror configured to focus the widened laser beam at a focal position within the target area; and a movement device. The movement device is configured to move the ellipsoid mirror or the hyperboloid mirror relative to the paraboloid mirror, or together with the paraboloid mirror, to change the focal position within the target area.

11 Claims, 6 Drawing Sheets

(56) References Cited

U.S. PATENT DOCUMENTS

| | | | |
|---|---|---|---|
| 2016/0195729 A1* | 7/2016 | Lambert | G02B 27/1006 250/504 R |
| 2016/0198557 A1* | 7/2016 | Enzmann | G02B 27/142 359/356 |
| 2017/0325325 A1 | 11/2017 | Lambert et al. | |

FOREIGN PATENT DOCUMENTS

| EP | 2624913 | 8/2013 |
|---|---|---|
| TW | 201215245 A | 4/2012 |
| WO | WO 2012050685 A1 | 4/2012 |
| WO | WO 2015036024 A1 | 3/2015 |
| WO | WO 2015036025 A1 | 3/2015 |
| WO | WO 2016116147 A1 | 7/2016 |

* cited by examiner

FOCUSING DEVICE AND EUV RADIATION GENERATING DEVICE HAVING SAME

CROSS-REFERENCE TO PRIOR APPLICATIONS

This application is a continuation of International Patent Application No. PCT/EP2018/062317, filed on May 14, 2018, the entire disclosure of which is hereby incorporated by reference herein.

FIELD

The present invention relates to a focusing device for focusing a laser beam in a target area, in particular for the generation of extreme ultraviolet (EUV) radiation. The invention also relates to an EUV radiation generating apparatus having such a focusing device.

BACKGROUND

An EUV radiation generating apparatus having a beam guiding device which has such a focusing device in order to focus two laser beams in a target area has been disclosed by WO 2015/036024 A1. A target material for generating EUV radiation can be introduced into the target area, which is formed in a vacuum chamber. The target material can be, for example, tin droplets, which the laser beam strikes in order to generate the EUV radiation. The focusing device can also be used in other optical devices, for example, in a laser-machining machine, in particular, in a laser cutting or in a laser welding machine.

WO 2016/116147 A1 has disclosed a beam guiding device that has four mirrors with curved reflective surfaces and a movement device, which is designed to move the second and the third reflective surface together relative to the first and fourth reflective surface. The second and the third mirror can be attached to a common carrier at a fixed distance from each other, and the movement device can be designed to move the common carrier for the joint movement of the second and of the third mirror relative to the first and fourth mirror.

A beam guiding device for an EUV radiation generating apparatus that has a focusing device has also been disclosed by WO 2015/036025 A1. There, a paraboloid mirror is used to superimpose two laser beams, which strike a first and a second surface area of the paraboloid mirror that surrounds the first annularly. In order to change the focal position within the target area, a motor-driven, planar deflection mirror is used, which is arranged in the beam path after the focusing mirror of the focusing device.

When implementing a focus movement with the aid of at least one deflection mirror, in addition to the widening mirror and the focusing mirror, at least one additional optical element in the beam path and an additional actuator are needed. In applications in which the provision of each (further) reflective optical element leads to significant power losses and/or in which the installation space is very limited, the adjustment of the focal position by means of an actuatable deflection mirror is inconvenient or may be impossible.

SUMMARY

According to an embodiment, a focusing device is provided for focusing a laser beam in a target area. The focusing device includes a paraboloid mirror configured to widen the laser beam; an ellipsoid mirror or a hyperboloid mirror configured to focus the widened laser beam at a focal position within the target area; and a movement device. The movement device is configured to move the ellipsoid mirror or the hyperboloid mirror relative to the paraboloid mirror, or together with the paraboloid mirror, to change the focal position within the target area.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
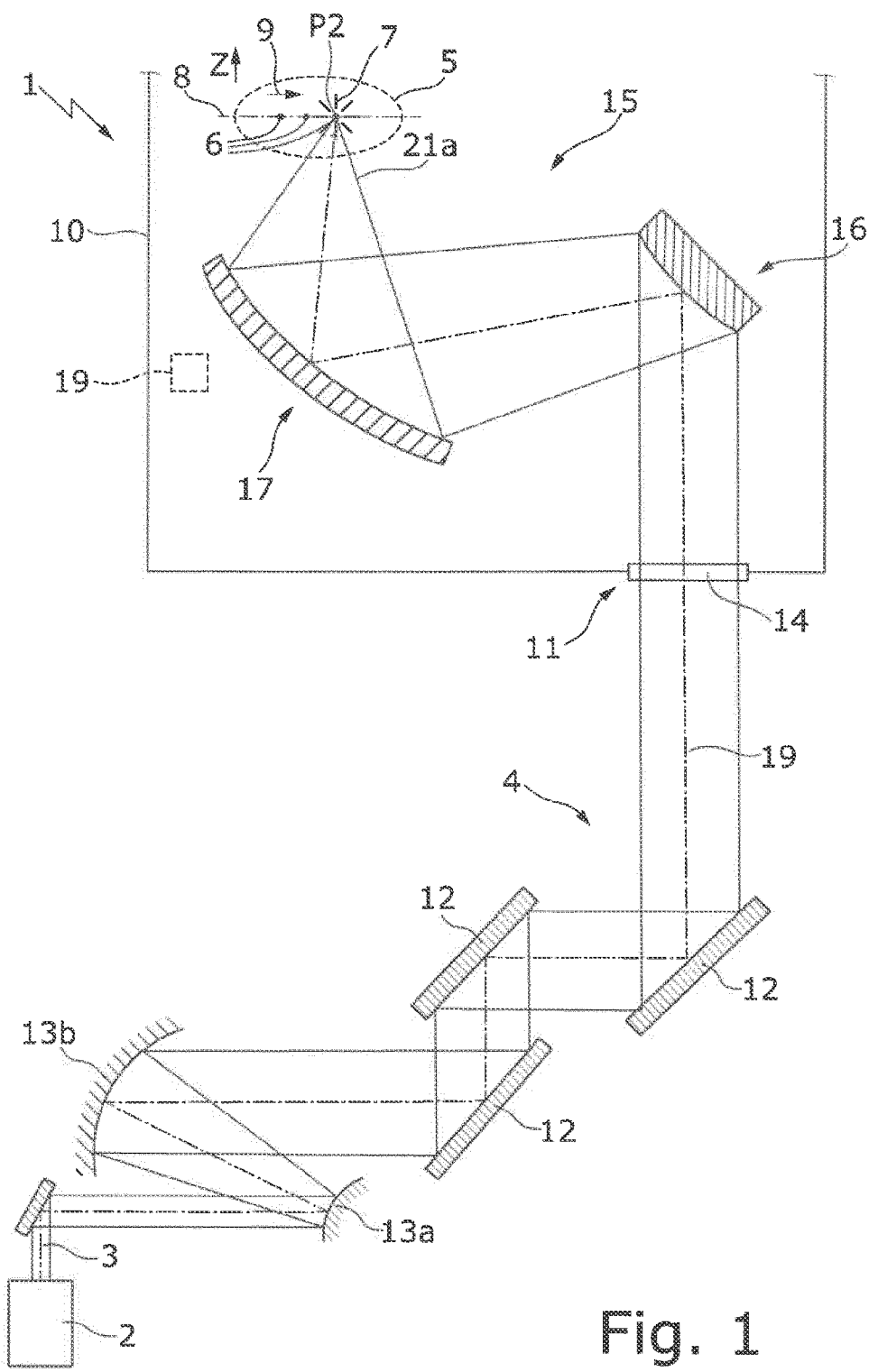
FIG. 1 shows a schematic illustration of an EUV radiation generating apparatus, which has a focusing device with a paraboloid mirror for widening and an ellipsoid mirror for focusing a laser beam at a focal position which is formed in a target area.

Embodiments of the present invention provide a focusing device and an EUV radiation generating apparatus, having such a focusing device, in which the focal position can be positioned as freely as possible in space without enlarging the installation space significantly and without the addition of further optical elements.

According to embodiments of the invention, a focusing device is provided, which includes a movement device, which is designed to move the ellipsoid or hyperboloid mirror relative to the paraboloid mirror (and/or together with the paraboloid mirror) in order to change the focal position within the target area.

According to an embodiment of the present invention, instead of an additional optical element, for example an actuatable deflection mirror, at least one of the two mirrors of the focusing device may be moved for the change in the focal position. A movement device can be designed to move both mirrors together whilst maintaining their distance from each other. The movement device can be designed to move only one of the mirrors, for example the ellipsoid or hyperboloid mirror, while the other mirror remains stationary, or to move both mirrors in a superimposed movement relative to each other and both together. The movement device can be designed to rotate at least one of the two mirrors and/or to displace at least one of the two mirrors. For this purpose, the movement device can have suitable rotational drives or translational drives.

In one embodiment, the paraboloid mirror and the ellipsoid or hyperboloid mirror are arranged at a fixed distance relative to each other and preferably attached to a common carrier. In this case, the two mirrors may be arranged in such a way and at such a distance that the focal position of the paraboloid mirror and one of the two focal positions of the ellipsoid or hyperboloid mirror coincide. In this way, the generally collimated laser beam, which is generally incident parallel to the axis of symmetry of the paraboloid mirror, is projected or focused without imaging errors onto the second focal position of the ellipsoid mirror which, in this case, is located within the target area. In this application, a paraboloid mirror, an ellipsoid mirror and a hyperboloid mirror are understood as generally conventionally reflective mirror surfaces, which merely form a sub region of a paraboloid, an ellipsoid or a hyperboloid. A widening paraboloid mirror is not necessarily understood as a paraboloid mirror with a convexly curved reflective surface. A paraboloid mirror with a concavely curved reflective surface can also be used for beam widening; in this case, the focal position of the paraboloid mirror forms an intermediate focus and the laser beam is widened after the intermediate focus. At high powers, intermediate foci should be avoided, however, because of the risk of a gas breakthrough.

In an embodiment, the movement device is designed for the common displacement of the paraboloid mirror and of the ellipsoid or hyperboloid mirror, preferably for the common movement of the carrier, in at least one spatial direction, preferably in two or in three spatial directions. In this case, the focusing device is typically moved freely in space in a Cartesian manner (without rotation), in order to move the focal position likewise freely in space. If the position of the laser beam incident in the focusing device remains in a fixed location, during the movement of the focusing device in a direction that does not extend parallel to the direction of incidence of the laser beam, the position in which the laser beam strikes the paraboloid mirror changes. Accordingly, the position of the widened laser beam on the ellipsoid or hyperboloid mirror also varies, so that the mirror surfaces must have a correspondingly large surface, depending on the size of the area in which the focal position is to be varied. For the movement of the mirrors in space, the latter are typically arranged on a common (mirror) carrier, which can be displaced freely in space with the aid of one, two or three linear axes or by means of suitable actuators, for example in the form of linear motors.

In an embodiment, the movement device is designed to rotate the ellipsoid or hyperboloid mirror about one of its two focal positions, specifically about the focal position that does not coincide with the focal position at which the laser beam is focused in the target area. In this case, the position of the ellipsoid or hyperboloid mirror is changed relative to the paraboloid mirror by the ellipsoid or hyperboloid mirror executing a rotational movement. The ellipsoid or hyperboloid mirror can be rotated only in one plane during the rotational movement or else freely in space, i.e. about at least two axes of rotation. The second focal position of the ellipsoid or hyperboloid mirror, at which the laser beam is focused, extends on a spherical shell during the rotational movement of the ellipsoid or hyperboloid mirror. The radius of the sphere or the spherical shell in this case corresponds to the distance between the two focal positions of the ellipsoid or hyperboloid mirror.

In an embodiment, the focal position of the paraboloid mirror coincides with the first focal position of the ellipsoid or hyperboloid mirror. In this case, this relative position of the focal position of the paraboloid mirror relative to the first focal position of the ellipsoid or hyperboloid mirror is maintained during the rotation of the ellipsoid or hyperboloid mirror about the first focal position. In this way, during any desired rotation of the ellipsoid or hyperboloid mirror, a perfect imaging is maintained, even if the ellipsoid or hyperboloid mirror is rotated about all spatial axes.

In a development, the ellipsoid or hyperboloid mirror and the paraboloid mirror are attached to a common carrier that can be displaced in at least one spatial direction. As has been described above, during the rotation of the ellipsoid or hyperboloid mirror, the second focal position of the ellipsoid or hyperboloid mirror moves on a circular path or on a spherical shell. In order to be able to move the focal position of the laser beam freely in space, it is therefore beneficial to superimpose a displacement or a translational movement on the rotational movement. For this purpose, the movement device can act on the common carrier, in order to displace the latter in at least one, preferably in exactly one, spatial direction.

In an embodiment, the movement device is designed to displace the carrier along an axis of symmetry of the paraboloid mirror. As a result of the displacement of the carrier along the axis of symmetry of the paraboloid mirror, the position of a laser beam that strikes the paraboloid mirror parallel to the axis of symmetry does not change during the displacement. Therefore, it is not necessary to dimension the paraboloid mirror, more precisely its reflective surface, to be larger than absolutely necessary for the movement of the focal position of the laser beam in space. For the movement of the focal position in space, in this case a superimposed movement of the displacement of the carrier and a rotation of the ellipsoid or hyperboloid mirror about the first focal position can be carried out. The movement device can, for example, have a linear drive and/or an aerostatic bearing for the displacement of the carrier along the axis of symmetry.

In an embodiment, the paraboloid mirror is arranged to be stationary. In this case, the movement device for changing the focal position acts only on the ellipsoid or hyperboloid mirror but not on the paraboloid mirror.

In an embodiment, the movement device is designed to displace the ellipsoid or hyperboloid mirror in at least one spatial direction relative to the paraboloid mirror in addition to the rotation about the first focal position. In the case in which the paraboloid mirror remains stationary, for the free movement of the focal position in space, the ellipsoid or hyperboloid mirror also executes a translational movement in addition to a rotational movement. In this way, the spherical shell on which the focal position moves during the rotation of the ellipsoid or hyperboloid mirror can be displaced in at least one, preferably in all three, spatial directions. For the movement of the ellipsoid or hyperboloid mirror, the movement device can, for example, have a 6-axis actuator, for example in the form of a hexapod or a Stewart platform.

During the translational movement, the relative position of the first focal position of the ellipsoid or hyperboloid mirror relative to the focal position of the paraboloid mirror changes, so that imaging errors occur which, as a rule, will turn out to be larger the greater the distance of the focal position of the paraboloid mirror from the first focal position of the ellipsoid of hyperboloid mirror.

In an embodiment, the movement device is designed to displace the ellipsoid or hyperboloid mirror along a displacement direction, which corresponds to a beam direction of the laser beam reflected at the paraboloid mirror in a basic position, in which the focal position of the paraboloid mirror coincides with the first focal position of the ellipsoid or hyperboloid mirror. It has been shown that the imaging errors that occur during the displacement of the ellipsoid or hyperboloid mirror along this displacement direction are smaller than is the case during the displacement along other displacement directions. By means of a superimposed rotational movement of the ellipsoid or hyperboloid mirror and a displacement along the above-defined displacement direction, the laser beam can be moved freely in space with minimal aberrations.

The present invention also provides an EUV radiation generating apparatus, comprising a vacuum chamber, into which a target material for the generation of the EUV radiation in a target area can be introduced, a beam source for generating a laser beam, a focusing device which is formed as described further above for focusing the laser beam in the target area to generate EUV radiation, and a beam guiding device for guiding the laser beam from the beam source to the focusing device. The beam source can be designed to generate a laser beam with very high power (>10 kW). The beam source can be designed to generate a laser beam having a wavelength in the region of around 10 μm, for example as a $CO_2$ laser. The beam source can also be designed to generate a laser beam having a wavelength in the region of about 1 μm, for example as a solid state laser. The target material introduced into the vacuum chamber is hit by the focused laser beam and hereby transferred into a plasma state, which is used to generate EUV radiation. The target material, which, for example, can be tin droplets, is supplied to the target area with the aid of a providing device, which guides the target material along a predefined path that crosses the target area. With the aid of the focusing device described further above, the focal position can be changed dynamically and, during the generation of the EUV radiation, the laser beam can be positioned at virtually any desired location within the target area. The EUV radiation generating device can also have an open-loop and/or closed-loop control device for controlling or regulating the focal position in the target area.

In one embodiment, the beam guiding device for guiding the in particular collimated laser beam to the paraboloid mirror is designed to be parallel to an axis of symmetry of the paraboloid mirror. For the case in which the (collimated) laser beam strikes the paraboloid mirror parallel to the axis of symmetry, the laser beam is projected or focused onto the focal position of the paraboloid mirror virtually without aberrations.

Further advantages of the invention can be gathered from the description and the drawing. Likewise, the features cited above and those listed further on can each be used on their own or in a plurality in any desired combinations. The embodiments shown and described are not to be understood as a final enumeration, but instead have an exemplary character for the narrative of the invention.

In the following, identical reference signs are used for the same or functionally identical components.

FIG. 1 shows an EUV radiation generating apparatus 1 having a beam source 2 in the form of a driver laser formed as a $CO_2$ laser, which generates a pulsed laser beam 3 with high radiation power (>>1 kW). To generate the laser beam 3 with high radiation power, the beam source 2 can comprise multiple amplifiers. In the example shown, the laser beam 3 generated by the $CO_2$ laser has a wavelength of about 10.6 μm. The use of a beam source 2 to generate a (pulsed) laser beam with a different wavelength, for example of about 1 μm (e.g. in the form of a solid state laser), is likewise possible.

The EUV radiation generating apparatus 1 also comprises a beam guiding device 4, by means of which the laser beam 3 is guided in the direction of a target area 5, into which a target material 6 in the form of tin droplets is introduced in order to generate EUV radiation 7. For reasons of clarity, the illustration of measuring devices for monitoring the beam energy of the laser beam 3 has been omitted. The target material 6, i.e. the tin droplets, are produced by means of a providing device (not shown), and the droplets move along a predefined movement path 8 or a predefined path, which corresponds to a substantially horizontal, rectilinear movement path of the type of a parabolic trajectory, along a horizontal movement direction 9. The movement direction 9 can also correspond to another direction, e.g. the direction of gravity.

The target material 6 is transferred by means of the laser beam 3 into a plasma state, wherein the EUV radiation 7 is being generated. For the specific alignment and focusing of the EUV radiation 7 generated in this way, the EUV radiation generating apparatus 1 has an EUV focusing mirror (not shown). The target material 6, the EUV focusing mirror and the target area 5 into which the target material 6 can be introduced are arranged in a vacuum chamber 10, whereas the beam source 2 is arranged outside the vacuum chamber 10.

To guide the laser beam 3 in the direction of the target area 5, starting from the beam source 2, the laser beam 3 is guided via an opening 11 into the vacuum chamber 10. To guide the laser beam 3 from the radiation source 2 to the opening 11, the beam guiding device 4 has a plurality of deflection mirrors 12 and a pair of parabolic mirrors 13a, b, the latter being used to change the beam cross section of the laser beam 3. In addition or alternatively to the use of parabolic mirrors 13a, b, ellipsoid or hyperboloid mirrors can also be used to change the beam cross-section of the laser beam 3.

The opening 11 in the vacuum chamber 10 is closed in a gas-tight manner by a plate-shaped optical element 14 in the form of a window. Arranged in the vacuum chamber 10 is a focusing device 15, which comprises a paraboloid mirror 16 and an ellipsoid mirror 17. The paraboloid mirror 16 is used to widen the laser beam 3 supplied in collimated form by the beam guiding device 4 and has a convex curvature. The ellipsoid mirror 17 is used to focus the widened laser beam 3 at a focal position P2 in the target area 5, into which a tin droplet of the target material 6 is introduced in the example shown.

Figure 2A:
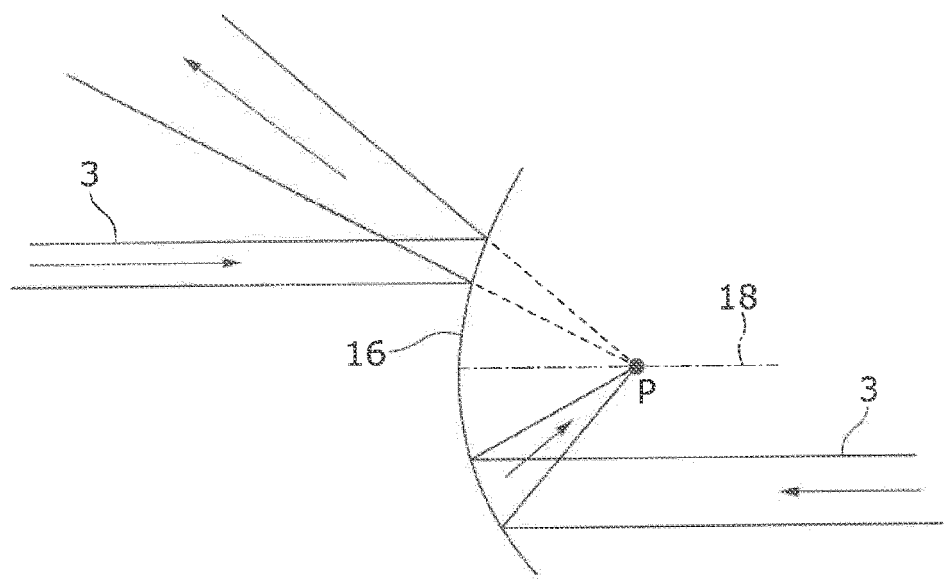
FIGS. 2a and 2b show schematic illustrations of the imaging properties of a paraboloid mirror and an ellipsoid mirror.
Figure 2B:
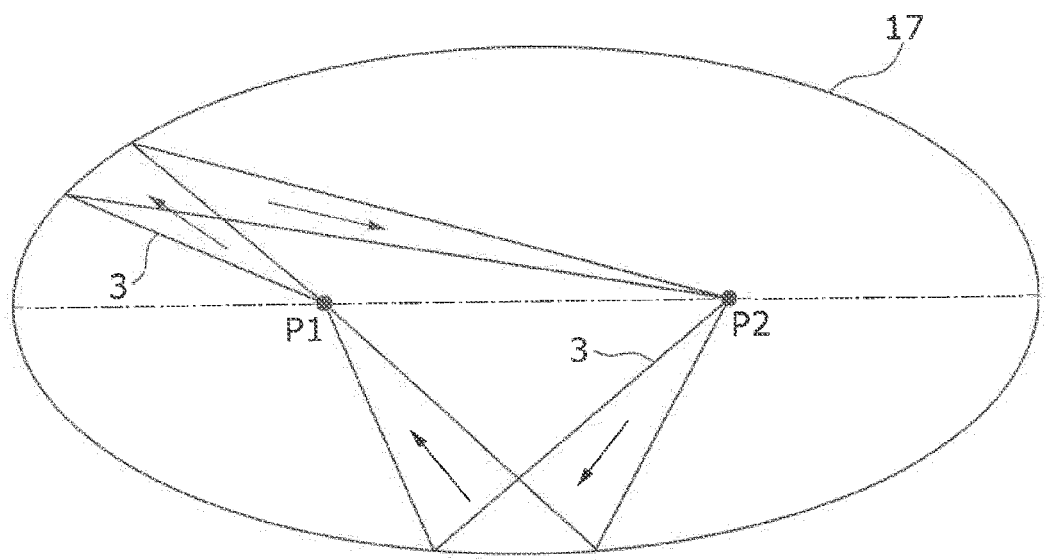

In the following, by using FIGS. 2a, b, the imaging properties of the paraboloid mirror 16 and of the ellipsoid mirror 17 will be explained. In the paraboloid mirror 16 shown in FIG. 2a, a collimated laser beam 3 striking parallel to the axis of symmetry 18 of the paraboloid mirror 16 is imaged or focused onto the focal position P of the paraboloid mirror 16 perfectly, i.e. without aberrations, specifically irrespective of whether the collimated laser beam 3 strikes the concavely or the convexly curved side of the paraboloid mirror 16, i.e. irrespective of whether the laser beam 3 is imaged really or virtually. In a corresponding way, in the ellipsoid mirror 17 of FIG. 2b, a laser beam 3 originating from a first focal position P1 is imaged without aberrations onto a second focal position P2 of the ellipsoid mirror 17, and vice versa. In the illustration shown in FIG. 2b, the ellipsoid mirror 17 is illustrated in the form of a complete ellipsoid or a complete ellipse; however, it goes without saying that the ellipsoid mirror 17 is formed as shown in FIG. 1, i.e. merely forms a sub region of the shell-shaped ellipsoid from FIG. 2b.

Figure 3A:
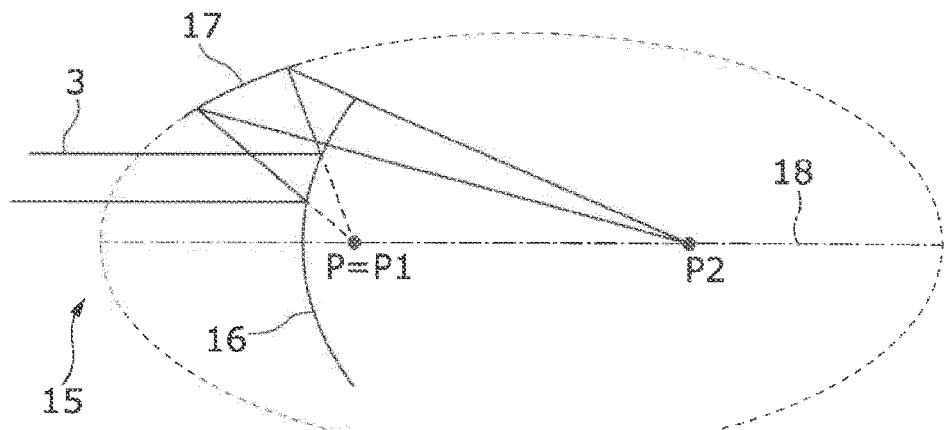
FIGS. 3a-3c show schematic illustrations of the focusing device from FIG. 1, in which the paraboloid mirror and the ellipsoid mirror are arranged at a fixed distance from each other and can be displaced along three spatial directions by means of a movement device.

As can be seen in FIG. 3a, which shows the focusing device 15 from FIG. 1 in detail, in the focusing device 15 the focal position P of the paraboloid mirror 16 coincides with the first focal position P1 of the ellipsoid mirror 17, and the second focal position P2 of the ellipsoid mirror 17 is located within the target area 5. Given the alignment shown in FIG. 3a of the incident collimated laser beam 3 parallel to the axis of symmetry 18 of the paraboloid mirror 16, the laser beam 3 is imaged without aberrations onto the second focal position P2 within the target area 5.

In order to vary the focal position P2 within the target area 5, the focusing device 15 has a movement device 19, illustrated schematically in FIG. 1, which is designed to move the ellipsoid mirror 17 relative to the paraboloid mirror 16 (or vice versa) and/or together with the paraboloid mirror 16. For the implementation of the movement device 19, there are various possibilities, which will be explained in detail below.

Figure 3B:
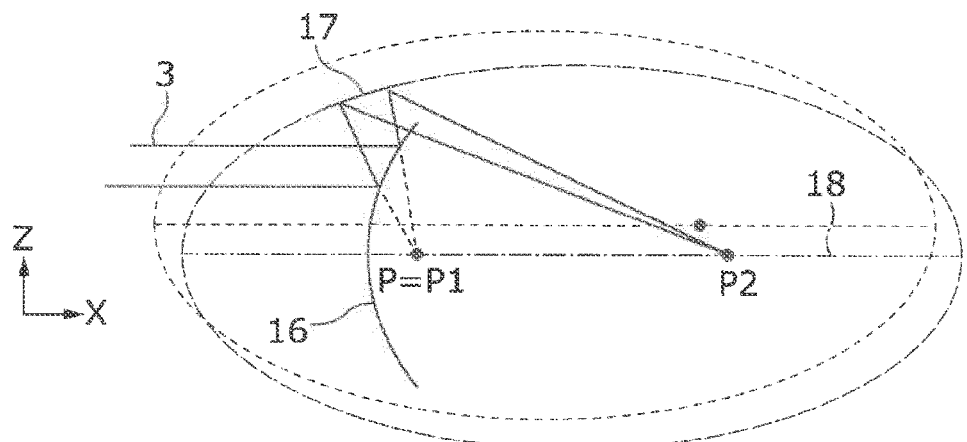
Figure 3C:
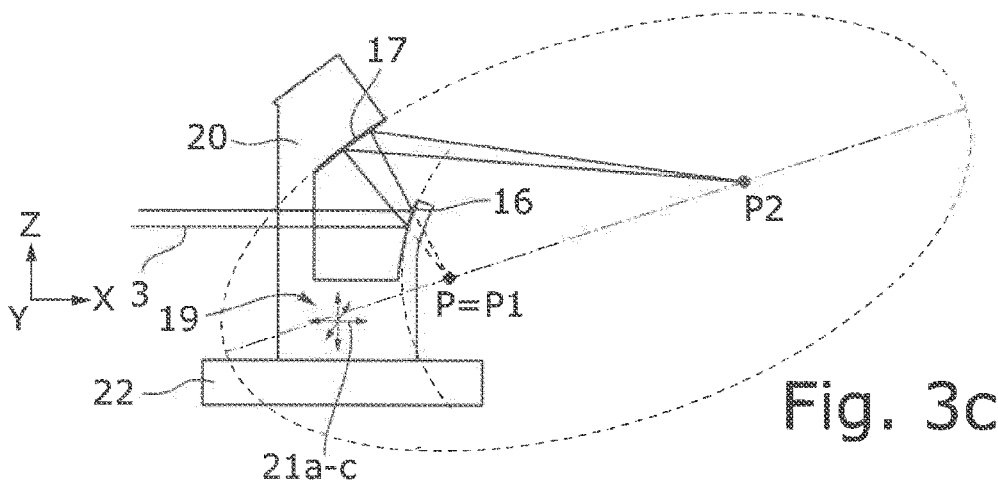

In the focusing device 15 shown in FIG. 3b, c, the paraboloid mirror 16 and the ellipsoid mirror 17 are arranged at a fixed distance from each other and, for this purpose, are fixed on a common carrier 20 (cf. FIG. 3c). The carrier 20 is displaceable in three spatial directions with the aid of a movement device 19, which has three linear drives 21a-c, which are indicated by double arrows in FIG. 3c. In the example shown in FIG. 3c, the carrier 20 is supported on a stationary sub-base 22 by means of an aerostatic mounting. With the aid of the movement device 19, the paraboloid mirror 16 and the ellipsoid mirror 17 can be displaced in three mutually perpendicular spatial directions together, i.e. without any relative movement. The focal position P2 within the target area 5 is displaced accordingly in this case without aberrations occurring hereby.

As can be seen by using FIG. 3b, during the displacement of the ellipsoid mirror 17 and of the paraboloid mirror 16, the position at which the laser beam 3 strikes the paraboloid mirror 16 changes if the displacement does not extend parallel to the X-direction, which corresponds to the axis of symmetry 18 of the paraboloid mirror 16. The paraboloid mirror 16, and also the ellipsoid mirror 17, therefore have a possibly widened reflective surface, depending on the size of the region within which the focal position P2 is to be moved.

Figure 4A:
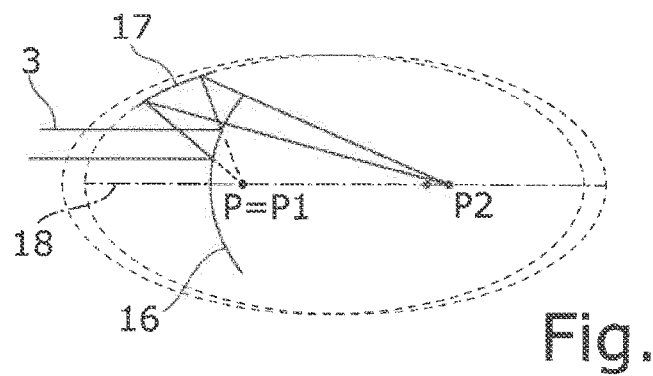
FIGS. 4a-4c show schematic illustrations analogous to FIGS. 3a-3c, in which the ellipsoid mirror is rotated about a first focal position and, together with the paraboloid mirror, is displaced along the axis of symmetry of the paraboloid mirror.
Figure 4B:
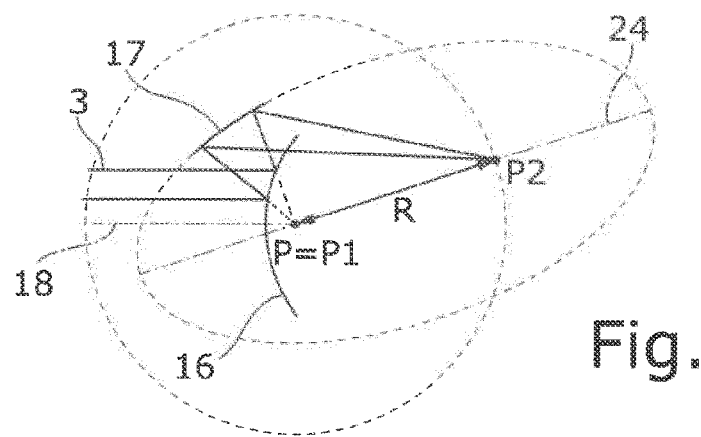
Figure 4C:
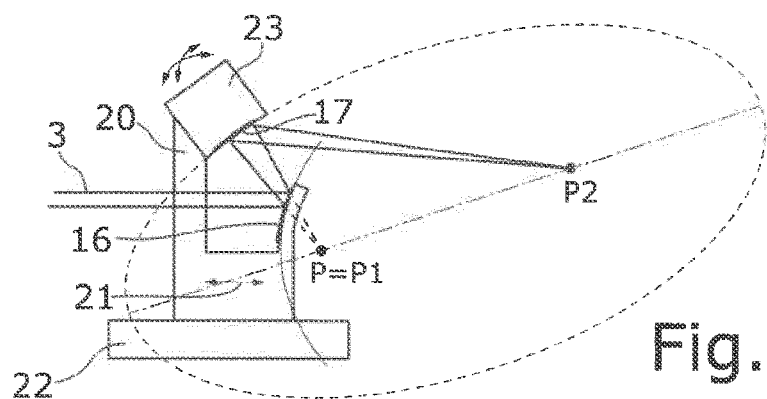

In the focusing device 15 shown in FIGS. 4a-c, the ellipsoid mirror 17 and the paraboloid mirror 16 are likewise attached to a common mirror carrier 20, illustrated in FIG. 4c. The common carrier 20 can be displaced in the direction of the incident laser beam 3 or in the direction of the axis of symmetry 18 of the paraboloid mirror 16 with the aid of a linear drive 21 of the movement device 19 indicated by a double arrow, as shown in FIG. 4a. The ellipsoid mirror 17 is additionally rotatable about its first focal position P1 by means of a rotational actuator 23 of the movement device 19, as is illustrated in FIG. 4b and in FIG. 4c.

The ellipsoid mirror 17 is fixed to the carrier 20 via the rotational actuator 23 for the implementation of the rotational movement. As can be seen in FIG. 4b and in FIG. 4c, here the (long) axis of symmetry 24 of the ellipsoid mirror 17 is rotated about the first focal position P1, by which means the second focal position P2 of the ellipsoid mirror 17 is rotated about the first focal position P1 along a spherical shell, wherein the radius R of the rotational movement corresponds to the distance between the first focal position P1 and the second focal position P2 of the ellipsoid mirror 17. During the rotation of the ellipsoid mirror 17 about the first focal position P1, the perfect, aberration-free imaging is maintained.

In the focusing device 15 shown in FIGS. 4a-c, both mirrors 16, 17 are displaced solely parallel to the incident laser beam 3 by means of the linear drive 21 of the movement device 19. Therefore, the laser beam 3 always strikes the paraboloid mirror 16 at the same point, so that the latter can generally be dimensioned to be smaller than is the case in the focusing device 15 shown in FIGS. 3a-c.

Figure 5A:
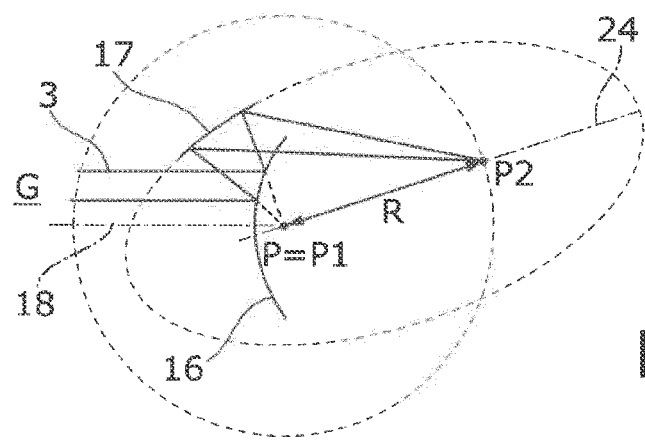
FIGS. 5a and 5b show schematic illustrations of the focusing device from FIGS. 4b and 4c, in which the paraboloid mirror is stationary and the ellipsoid mirror is displaced along a displacement direction.
Figure 5B:
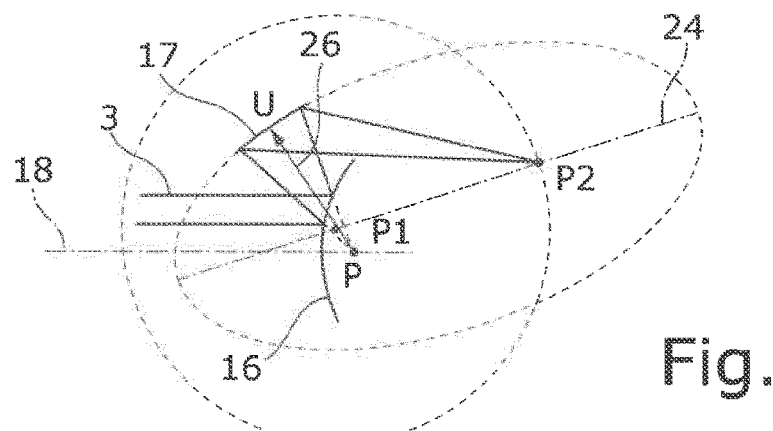
Figure 6A:
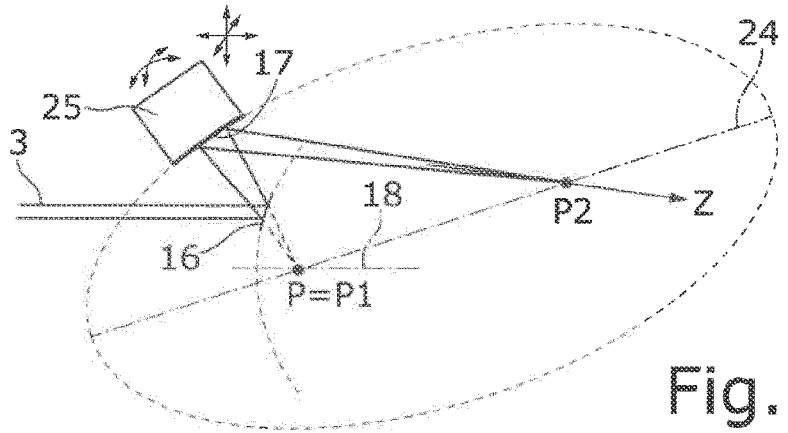
FIGS. 6a-6c show schematic illustrations of the focusing device from FIGS. 5a and 5b, during the changing of the focal position by the movement of the ellipsoid mirror by means of a movement device in the form of a six-axis actuator.
Figure 6B:
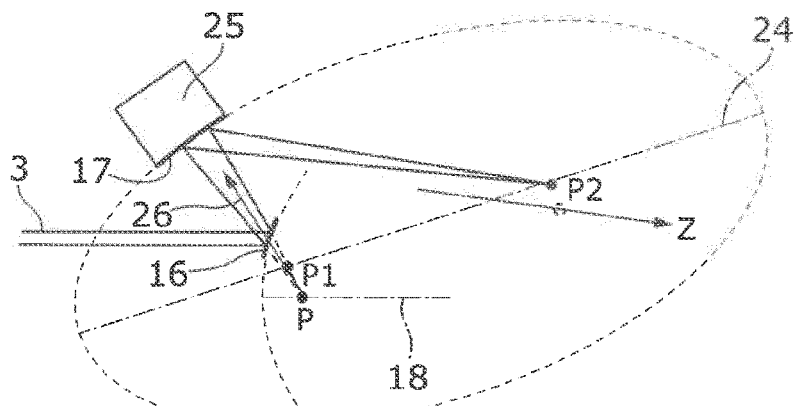
Figure 6C:
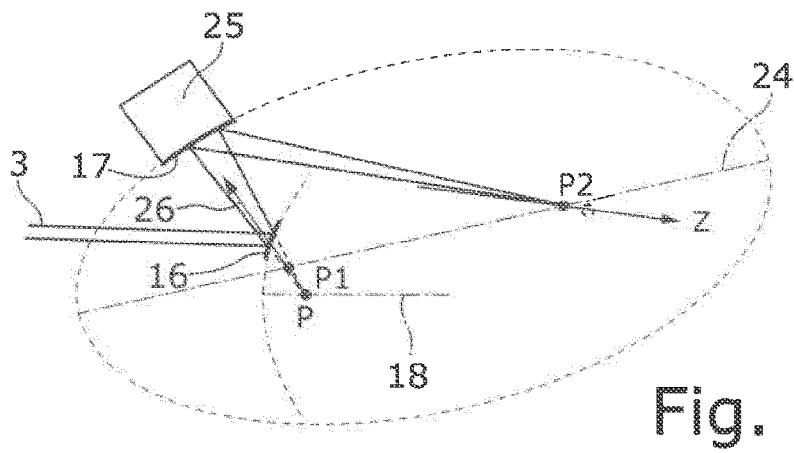

In the focusing device 15 shown in FIGS. 5a, b and in FIGS. 6a-c, the paraboloid mirror 16 is arranged to be stationary and the movement device 19 has a 6-axis actuator 25, for example in the form of a hexapod or a Stewart platform, by means of which the ellipsoid mirror 17 can be displaced in three spatial directions and additionally rotated in space. The rotation of the ellipsoid mirror 17 is carried out here about its first focal position P1, as in the focusing device 15 illustrated in FIGS. 4a-c. The movement device 19 has, in addition to the 6-axis actuator 25, a control device, for example in the form of a microprocessor, in order to drive the 6-axis actuator 25 to displace the ellipsoid mirror 17 along a displacement direction 26, which corresponds to a beam direction of the laser beam 3 reflected at the paraboloid mirror 16 in a basic position shown in FIG. 5a, in which the focal position P of the paraboloid mirror 16 coincides with the first focal position P1 of the ellipsoid mirror 17. The displacement direction 26 also corresponds to the direction of the widened, reflected laser beam 3 between the stationary focal position P of the paraboloid mirror 16 and a deflection point U, at which the laser beam 3 is focused by the ellipsoid mirror 17 in the direction of the second focal position P2.

By using FIGS. 6a-c, it will be explained how the focal position P2 of the focusing device 15 can be displaced along the (arbitrarily chosen) Z direction by means of the movement device 19 shown in FIGS. 5a, b, by using the 6-axis actuator 25. In the example shown in FIGS. 6a-c, first the ellipsoid mirror 17 is rotated about its first focal position P1, as can be seen in FIG. 6a. Then, the ellipsoid mirror 17 is displaced along the displacement direction 26 by a pre-defined distance, by which means the second focal position P2 is displaced by an amount dependent on the ratio of the focal lengths of the ellipsoid mirror 17, as can likewise be seen in FIG. 6b. As shown in FIG. 6c, the ellipsoid mirror 17 is then rotated again about its (new) first focal position P1 until the second focal position P2 is again located on the (arbitrarily chosen) Z direction. In this way, the laser beam 3 can be displaced along a line extending in any desired direction within the target area 5.

By means of the movement of the ellipsoid mirror 17 and/or of the paraboloid mirror 16, the focal position P2 can be changed within the target area 5 without additional optical elements, such as actuatable deflection mirrors or the like, being needed for this purpose. Alternatively to the focusing mirror described further above in the form of an ellipsoid mirror 17, a hyperboloid mirror can also be used. The hyperboloid mirror likewise has two focal positions and images a laser beam originating from one focal position without aberrations onto the other focal position. The rotation of the hyperboloid mirror can be carried out in a manner analogous to the ellipsoid mirror about a first focal position in order to change the second focal position of the hyperboloid mirror within the target area 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A focusing device for focusing a laser beam in a target area, the focusing device comprising:
   a paraboloid mirror configured to widen the laser beam;
   an ellipsoid mirror or a hyperboloid mirror configured to focus the widened laser beam at a focal position within the target area; and
   a movement device configured to move the ellipsoid mirror or the hyperboloid mirror together with the paraboloid mirror, to change the focal position within the target area, wherein the paraboloid mirror is arranged at a fixed distance from the ellipsoid mirror or the hyperboloid mirror, and wherein the movement device is configured to displace the ellipsoid mirror or the hyperboloid mirror together with the paraboloid mirror, in at least one translational spatial direction.

2. The focusing device as claimed in claim 1, wherein the movement device is configured to displace the ellipsoid mirror or the hyperboloid mirror together with the paraboloid mirror, in two or in three spatial directions.

3. The focusing device as claimed in claim 1, wherein the movement device is configured to rotate the ellipsoid mirror or the hyperboloid mirror about a first of its two focal positions.

4. The focusing device as claimed in claim 3, wherein the focal position of the paraboloid mirror coincides with the first focal position of the ellipsoid mirror or the hyperboloid mirror.

5. The focusing device as claimed in claim 3, wherein the ellipsoid mirror or hyperboloid mirror and the paraboloid mirror are attached to a common carrier that is configured to be displaced in the at least one spatial direction.

6. The focusing device as claimed in claim 5, wherein the movement device is configured to displace the common carrier along an axis of symmetry of the paraboloid mirror.

7. An extreme ultraviolet (EUV) radiation generating apparatus comprising:
   a vacuum chamber configured to receive a target material in a target area to generate EUV radiation,
   a beam source configured to generate a laser beam,
   a focusing device as claimed in claim 1 for focusing the laser beam in the target area to generate the EUV radiation, and
   a beam guiding device for guiding the laser beam to the focusing device.

8. The EUV radiation generating apparatus as claimed in claim 7, wherein the beam guiding device is designed to guide the laser beam to the paraboloid mirror parallel to an axis of symmetry of the paraboloid mirror.

9. The focusing device as claimed in claim 1, wherein the paraboloid mirror is arranged at the fixed distance from the ellipsoid mirror or the hyperboloid mirror on a common carrier.

10. The focusing device as claimed in claim 9, wherein the movement device is configured to displace the common carrier in the at least one spatial direction or in three spatial directions.

11. The focusing device as claimed in claim 1, wherein the movement device comprises at least one drive operatively coupled to a controller that is configured to operate the at least one drive to move the ellipsoid mirror or the hyperboloid mirror.

* * * * *